(12) United States Patent
Kuhmann et al.

(10) Patent No.: US 9,309,998 B2
(45) Date of Patent: Apr. 12, 2016

(54) FLEXIBLE PIPE AND PROCESS FOR PRODUCTION THEREOF

(75) Inventors: Karl Kuhmann, Duelmen (DE); Andreas Dowe, Borken (DE); Rainer Goering, Borken (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/640,679

(22) PCT Filed: Apr. 6, 2011

(86) PCT No.: PCT/EP2011/055351
§ 371 (c)(1),
(2), (4) Date: Oct. 11, 2012

(87) PCT Pub. No.: WO2011/128237
PCT Pub. Date: Oct. 20, 2011

(65) Prior Publication Data
US 2013/0025735 A1    Jan. 31, 2013

(30) Foreign Application Priority Data
Apr. 13, 2010 (DE) .......................... 10 2010 003 916

(51) Int. Cl.
| | | |
|---|---|---|
| B32B 37/14 | (2006.01) |
| F16L 11/08 | (2006.01) |
| B29C 53/58 | (2006.01) |
| B29K 23/00 | (2006.01) |
| B29K 27/12 | (2006.01) |
| B29K 71/00 | (2006.01) |
| B29K 77/00 | (2006.01) |
| B29K 81/00 | (2006.01) |

(52) U.S. Cl.
CPC ............. *F16L 11/088* (2013.01); *B29C 53/581* (2013.01); *B29K 2023/00* (2013.01); *B29K 2027/12* (2013.01); *B29K 2071/00* (2013.01); *B29K 2077/00* (2013.01); *B29K 2081/00* (2013.01)

(58) Field of Classification Search
CPC ........... B29D 23/001; B29D 2030/385; B29K 2027/06; B29K 2105/08; B29K 2105/10; B29K 2105/258; B29K 2023/00; B29K 2027/12; B29K 2077/00; B29K 2081/00; B29K 2071/00; B29C 47/0023; B29C 53/8016; B29C 53/58; B29C 53/581; B29C 53/582; B29C 53/66; B29C 63/06; B29C 47/0026; B29C 53/68; B29C 53/821; F16L 11/088
USPC ......... 156/172, 169, 173, 187, 184, 188, 171, 156/166
See application file for complete search history.

(56) References Cited

U.S. PATENT DOCUMENTS

| | | | |
|---|---|---|---|
| 5,488,975 A * | 2/1996 | Chiles et al. ................... | 138/125 |
| 5,876,548 A | 3/1999 | Strassel et al. | |
| 6,123,114 A * | 9/2000 | Seguin et al. ................. | 138/124 |
| 6,677,018 B1 * | 1/2004 | Satoh ........................... | 428/36.9 |
| 8,303,873 B2 | 11/2012 | Dowe et al. | |
| 2004/0140668 A1 * | 7/2004 | Monsheimer et al. ........ | 285/256 |
| 2006/0182916 A1 | 8/2006 | Dowe et al. | |
| 2006/0183869 A1 | 8/2006 | Dowe et al. | |
| 2007/0036925 A1 | 2/2007 | Braad | |
| 2007/0125438 A1 | 6/2007 | Hardy et al. | |
| 2008/0236694 A1 | 10/2008 | Takagi | |
| 2009/0133771 A1 | 5/2009 | He | |
| 2010/0009106 A1 | 1/2010 | Dowe et al. | |
| 2010/0300572 A1 | 12/2010 | Dowe et al. | |
| 2010/0300573 A1 * | 12/2010 | Dowe et al. ................... | 138/145 |
| 2011/0165358 A1 | 7/2011 | Dowe et al. | |
| 2011/0209768 A1 | 9/2011 | Dowe et al. | |
| 2012/0000541 A1 | 1/2012 | Dowe et al. | |
| 2012/0006465 A1 | 1/2012 | Dowe et al. | |
| 2012/0199317 A1 | 8/2012 | Hartmann et al. | |
| 2012/0275774 A1 | 11/2012 | Goering et al. | |
| 2012/0279577 A1 | 11/2012 | Goering et al. | |
| 2013/0171388 A1 | 7/2013 | Pawlik et al. | |

FOREIGN PATENT DOCUMENTS

| | | |
|---|---|---|
| AU | 8042175 | 11/1976 |
| CN | 1217444 A | 5/1999 |
| EP | 1 975 495 | 10/2008 |
| JP | 5-508466 A | 11/1993 |
| JP | 2003-97770 A | 4/2003 |
| JP | 2004-92792 A | 3/2004 |
| WO | 99 67561 | 12/1999 |
| WO | 2005 028198 | 3/2005 |
| WO | 2007 006215 | 1/2007 |
| WO | 2010 026749 | 3/2010 |

OTHER PUBLICATIONS

International Search Report Issued Jun. 10, 2011 in PCT/EP11/55351 Filed Apr. 6, 2011.

(Continued)

*Primary Examiner* — Jacob T Minskey
*Assistant Examiner* — Vishal I Patel
(74) *Attorney, Agent, or Firm* — Oblon, McClelland, Maier & Neustadt, L.L.P.

(57) ABSTRACT

The invention relates to a flexible tube of multilayer construction having unbonded layers, wherein at least one layer is formed in that a tape made of a plastic molding compound is spirally wound about a further inner layer, wherein the upper and lower layers of the tape are simultaneously or subsequently welded to each other at overlapping regions. The tube is particularly suitable for offshore application in oil and gas extraction

20 Claims, No Drawings

(56) References Cited

OTHER PUBLICATIONS

U.S. Appl. No. 13/640,552, filed Oct. 11, 2012, Kuhmann, et al.
U.S. Appl. No. 13/639,765, filed Oct. 5, 2012, Kuhmann, et al.
U.S. Appl. No. 13/640,586, filed Oct. 11, 2012, Kuhmann, et al.
U.S. Appl. No. 14/224,807, filed Mar. 25, 2014, Franosch, et al.
U.S. Appl. No. 14/225,842, filed Mar. 26, 2014, Dowe, et al.
Office Action received Jul. 29, 2015, in Chinese Patent Application No. 201180018547.9, filed Apr. 6, 2011—English translation only.

* cited by examiner

FLEXIBLE PIPE AND PROCESS FOR PRODUCTION THEREOF

The present invention relates to a flexible pipe of multilayer structure with unbonded layers and to a process for the production thereof. For simplicity, this type of pipe is hereinafter termed an unbonded flexible pipe. It has high resistance to the diffusion of gases from any conveyed fluid, and can therefore be used with particular advantage for conveying crude oil, natural gas, methanol, $CO_2$ and the like.

Unbonded flexible pipes are per se prior art. Pipes of this type comprise an interior lining, usually in the form of a plastics tube, as barrier to escape of the conveyed fluid, and also one or more reinforcing layers on the external side of the said interior lining. The unbonded flexible pipe can comprise additional layers, examples being one or more reinforcing layers on the inner side of the interior lining, in order to inhibit collapse of the interior lining under high external pressure. This type of interior reinforcement is usually termed a carcass. There can also be an exterior sheath present, in order to provide a barrier to penetration of liquid from the exterior environment into the reinforcing layers or other internal polymeric or metallic functional layers. In many instances, a thermoplastic layer is introduced between the exterior reinforcing layers, and by way of example takes the form of wound "anti-wear tapes", the aim being to inhibit abrasion on the metal structure, caused by friction.

Typical unbonded flexible pipes are described by way of example in WO 01/61232, U.S. Pat. Nos. 6,123,114 and 6,085,799; they are also described in more detail in API Recommended Practice 17B, "Recommended Practice for Flexible Pipe", 3rd Edition, March 2002, and also in API Specification 17J, "Specification for Unbonded Flexible Pipe" 2nd Edition, November 1999.

The term "unbonded" in this context means that at least two of the layers, inclusive of reinforcing layers and plastics layers, have not been designed with bonding between the same. In practice, the pipe comprises at least two reinforcing layers which, over the length of the pipe, have been bonded to one another either directly or indirectly, i.e. by way of further layers. This makes the pipe sufficiently flexible that it can be rolled up for transport purposes.

Various embodiments of these unbonded flexible pipes are used in offshore applications, and also in various onshore applications, for transporting liquids, gases and slurries. By way of example, they can be used for transporting fluids where, over the length of the pipe, there is very high, or very different, water pressure, for example in the form of ascending pipelines which run from the sea bed up to equipment at or in the vicinity of the surface of the sea, or else in general terms in the form of pipes for transporting liquids or gases between various items of equipment, or in the form of pipes laid at great depth on the sea bed, or in the form of pipes between items of equipment in the vicinity of the surface of the sea.

In conventional flexible pipes, the reinforcing layer(s) is/are composed mostly of helically arranged steel wires, steel profiles or steel strip, and the individual layers here can have various winding angles relative to the axis of the pipe. Alongside this, there are also embodiments in which at least one reinforcing layer, or all of the reinforcing layers, is/are composed of fibres, for example of glass fibres, for example in the form of fibre bundles or of fibre textiles, generally embedded into a polymeric matrix.

In the prior art, the interior lining is usually composed of a polyolefin, such as polyethylene, which can also have been crosslinked, or of a polyamide, such as PA11 or PA12, or of polyvinylidene fluoride (PVDF).

Polyethylene has the disadvantage of swelling markedly in contact with crude oil or natural gas, and then undergoing creep. The non-polar fluid conveyed also permeates outwards to a major extent through the polyethylene wall. Polyethylene is therefore generally not used for lines with direct contact with product streams, but instead is mainly used for what are known as water injection lines.

Polyamides such as PA11 or PA12 have very good suitability as material for the interior lining, because they have very good mechanical properties and excellent resistance to hydrocarbons and exhibit only slight swelling. The particular suitability of polyamides has been described in detail in the publication OTC 5231 "Improved Thermoplastic Materials for Offshore Flexible Pipes". However, they can be used only up to at most about 70° C., since the process water present in the crude oil or, respectively, natural gas causes increasing hydrolysis at higher temperatures. The said hydrolysis reduces the molecular weight of the polyamide so severely as to cause considerable impairment of mechanical properties and finally failure of the pipe. API 17TR2 describes a detailed test procedure for determining hydrolysis properties for PA11, and this can be applied equally to PA12.

PVDF is used up to at most 130° C. After modification, it is stiff with low compressive deformability even at relatively high temperatures up to about 130° C. However, blistering and microfoaming are likely to occur at temperatures above 130° C. with a decrease in internal pressure. PVDF undergoes major swelling extending to about 25% in particular in supercritical $CO_2$; the blistering that occurs with pressure decrease results from the good permeation barrier, which implies poor diffusion. Local gas desorption occurs within the layer here, whereupon the cohesive strength of the material is exceeded.

In many instances, the temperatures of crude oil or natural gas emerging from the source are markedly above 130° C. If flexible pipe lines are to be used in accessing sources of this type, an upstream step of the process is needed to cool the fluid. It would therefore be desirable to have an available unbonded flexible pipe which can also be used at relatively high temperatures, so that the said step of the process can be omitted.

WO 2008/125807 describes a flexible pipe which can by way of example convey hot methanol in an umbilical and which comprises an interior layer made of PEEK or polyphenylene sulphide. The internal diameter of the said pipe is in the range from 4 to 500 mm, while the thickness of the PEEK layer is from 0.7 to 5 mm. Since, however, unbonded flexible pipes need a layer thickness of at least 2 mm and typically from 3 to 20 mm, in order to ensure that the layer has the mechanical stability necessary for installation and handling, the known high stiffness of PEEK here would give a pipe which does not have sufficient flexibility to allow it to be wound with acceptable radius onto a drum.

WO 99/67561 describes another embodiment of a flexible multilayer pipe with an internal PEEK tube. The pipe is composed of layers of polymer and of textile, and the design includes bonding between these various layers over the entire length of the pipe; the typical wall thickness of the internal tube is from 6 to 12 mm.

WO 2006/047774 describes a multilayer pipe with a layer composed of a semiaromatic polyamide.

U.S. Pat. No. 5,876,548 describes a flexible metal pipe in which, on a carcass, an elastomer layer has been applied and a layer made of a shrinkable polymer has been applied thereover; PEEK is one of a wide variety of possibilities specified for this purpose.

WO 2005/028198 describes an unbonded flexible pipe in which the interior lining is composed of a relatively thick polymer layer and a relatively thin film with barrier properties. Two extensive identical lists are given for the materials of the relatively thick polymer layer and of the film; the film can moreover be composed of metal. Both lists specify PEEK, PEKK and polyphenylene sulphide (PPS).

The pipe of U.S. Pat. No. 5,934,335 comprises a layer which can be composed of PFA. However, PFA creeps markedly at relatively high temperatures and, for certain directions of pressure, fills the intermediate spaces between the articulated regions of the carcass or the externally adjacent reinforcing layer, thus considerably reducing the flexibility of the pipe. Stress cracks moreover form in the deformed regions, and can lead to destruction of the interior lining. U.S. Pat. No. 5,934,335 therefore recommends that an elastomer be inserted into the intermediate spaces associated with the carcass.

The person skilled in the art faces a number of problems in the extrusion of the respective polymer layers. Firstly, it is difficult to extrude a pipe with large internal diameter when using high-melting-point polymers or when using moulding compositions based on polymers which intrinsically have only low melt strength. Secondly, when the melt of the moulding composition is extruded onto the carcass or a reinforcing layer, it penetrates into the intermediate spaces of the steel structure, leading to loss of flexibility and, because of different local cooling rates, interior stresses, which can cause failure of the polymer layer. It has therefore long been prior art to apply functional layers via winding of tapes.

WO 2004/048833 describes the winding of tapes onto an internal tube. The tapes are composed by way of example of a polyolefin moulding composition; they can have an adhesive coating intended to fix them in the region of overlap.

US 2007/0125438 describes a flexible pipe which comprises a wound layer made of tapes which are composed of polytetrafluoroethylene (PTFE).

Operating temperatures above 130° C. are thus possible.

US 2004/0060610 describes an unbonded flexible pipe which comprises, from the inside to the outside, a carcass, a helically wound layer made of plastic tapes, a pressure-resistant layer extruded thereover and made of plastic, at least one reinforcing layer, and also an exterior sheath.

However, a disadvantage of wound tapes of this type is that they can shift, and the result of this can be that some locations on the layer situated thereunder then lack any protective covering, an example of a possible result at the said location then being that the external pressure causes the material of the next layer of the internal sheath to creep into the intermediate spaces associated with the carcass, or that, if an anti-wear tape has been used, metal-to-metal friction occurs at the said location. Another disadvantage stems from the fact that a wound tape does not exhibit any adequate barrier effect with respect to the permeation of components of the conveyed fluid, and this is particularly true if the tension applied during winding has been lost because of relaxation over the course of time.

The object of the invention consists in avoiding the said disadvantages.

This object is achieved in that, during the production of a flexible pipe of multilayer structure with unbonded layers, a layer is formed by winding a tape made of a plastics moulding composition helically onto another more internal layer, and simultaneously or subsequently welding the upper and the lower sublayer of the tape to one another at overlap regions.

The tape is wound under tension, and the pressure applied therefore provides frictional bonding between the same and the underlying sublayer.

In one possible embodiment, there is a carcass located on the inner side of the interior lining of the unbonded flexible pipe. Carcasses of this type and their design are prior art. In another possible embodiment, the unbonded flexible pipe comprises no carcass, especially when it is not intended for operation under high external pressures.

The unbonded flexible pipe moreover comprises, on the external side of the interior lining, one or more reinforcing layers, which are usually composed of helically arranged steel wires, steel profiles, or steel strip. The design of the said reinforcing layers is prior art. The structure of at least one of the said reinforcing layers is preferably such that the layer withstands the internal pressure, and the structure of at least one other of the said reinforcing layers is such that the layer withstands tensile forces. The reinforcing layer(s) can be followed by an exterior sheath, usually in the form of a tube or hose made of a thermoplastic moulding composition or of an elastomer.

In a first embodiment, the tape is wound onto the carcass and then welded. Further layers of the interior lining can then be extruded onto the tape. Primary functions of the tape here are creep prevention and/or permeation barrier.

In a second embodiment, the tape is wound onto the tubular interior lining and then welded. This type of structure is useful when the internal pressure of the pipe is higher than the external pressure during operation; the tape can prevent creep of the interior lining into the gaps of the steel structure of the most adjacent reinforcing layer.

In a third embodiment, the tape is wound onto a reinforcing layer and then welded. It then separates two metallic reinforcing layers from one another and functions as anti-wear tape.

First, second and third embodiment can be combined with one another within the same pipe, and the materials of the tapes here can differ. By way of example, a pipe can comprise a first tape made of a PEEK moulding composition on the carcass and acting as barrier layer, and also acting to prevent creep. This is then followed externally by a layer applied by extrusion and composed of a fluoropolymer, e.g. PFA, and this layer in turn has a protective covering provided by a tape made of, for example, a polyphenylene sulphide (PPS) moulding composition, of a PEEK moulding composition or of a PPA moulding composition. Between the reinforcing layers that follow, there are then anti-wear tapes applied, made of a moulding composition with low sliding coefficient of friction, an example being a PEEK moulding composition.

Suitable materials for the tape are moulding compositions preferably based on semicrystalline polymers, for example on olefinic polymers, on polyamides, on fluoropolymers, on polyalkylene naphthalate, on polyphenyl sulphone, on polyarylene ether ketones, on polyphenylene sulphide, or on a polyarylene ether ketone/polyphenylene sulphide blend. The tape here can be a single-layer tape or else a multilayer tape, for example a two-layer tape, three-layer tape or four-layer tape.

The tape material can be composed of a material providing a barrier layer with respect to the diffusion of acidic, corrosive constituents, such as $H_2S$ or $CO_2$. As an alternative to this, in a multilayer embodiment, the tape can comprise a barrier layer with respect to the diffusion of acidic, corrosive constituents, such as $H_2S$ or $CO_2$, for example a layer made of EVOH moulding composition, or a metal foil, preferably made of aluminium. In the case of a multilayer embodiment it is generally possible, in the cases where layer adhesion is desired but the layer materials used are not compatible with one another, to make concomitant use of a suitable adhesion-promoter layer or of an adhesive. It is preferable that both surfaces of the tape are composed of moulding compositions of identical or similar composition, i.e. of moulding compositions of the same main polymer, or of moulding compositions based on mutually compatible polymers, in order to ensure good weldability.

Examples of possible layer arrangements are:
polyamide/PPS/polyamide
polyamide/polyalkylene naphthalate/polyamide
polypropylene/polyalkylene naphthalate/polypropylene
polyamide/polyalkylene naphthalate/polypropylene/polyamide
polyamide/polyarylene ether ketone/polyamide
polyarylene ether ketone/polyamide/polyarylene ether ketone
HDPE or PP/PPS/HDPE or PP
HDPE or PP/polyphenyl sulphone/HDPE or PP
PVDF/polyarylene ether ketone/PVDF
PVDF/PPS/PVDF
PVDF/PPS/other fluoropolymer
PVDF/polyphenyl sulphone/PVDF
polyamide/EVOH/polyamide
polyamide/EVOH/polypropylene/polyamide
HDPE or PP/EVOH/HDPE or PP
PVDF/EVOH/PVDF
polyamide/metal foil
polyamide/metal foil/polyamide
HDPE or PP/metal foil/HDPE or PP
fluoropolymer/metal foil/fluoropolymer The olefinic polymer used for the tape can firstly be a polyethylene, in particular a high-density polyethylene (HDPE), or an isotactic or syndiotactic polypropylene. The polypropylene can be a homo- or copolymer, for example using ethylene or 1-butene as comonomer; it is possible here to use random copolymers and also block copolymers. The polypropylene can moreover also have been impact-modified, for example in accordance with the prior art by using ethylene-propylene rubber (EPM) or EPDM. The syndiotactic polystyrene that can likewise be used according to the invention can be produced in a known manner via metallocene-catalysed polymerization of styrene.

The polyamide used for the tape can be produced from a combination of diamine and dicarboxylic acid, from an w-aminocarboxylic acid or from the corresponding lactam. In principle, it is possible to use any polyamide, such as PA6 or PA66. In one preferred embodiment, the monomer units of the polyamide comprise an average of at least 8, at least 9, or at least 10 carbon atoms. In the case of mixtures of lactams, it is the arithmetic average that is considered here. In the case of a combination of diamine and dicarboxylic acid, the arithmetic average of the number of carbon atoms of diamine and dicarboxylic acid in this preferred embodiment must be at least 8, at least 9, or at least 10. Examples of suitable polyamides are: PA610 (which can be produced from hexamethylenediamine [6 carbon atoms] and sebacic acid [10 carbon atoms], the average number of carbon atoms in the monomer units here therefore being 8), PA88 (which can be produced from octamethylene-diamine and 1,8-octanedioic acid), PA8 (which can be produced from caprylolactam), PA612, PA810, PA108, PA9, PA613, PA614, PA812, PA128, PA1010, PA10, PA814, PA148, PA1012, PA11, PA1014, PA1212 and PA12. The production of the polyamides is prior art. It is also possible, of course, to use copolyamides based on these materials, and concomitant use can optionally also be made here of monomers such as caprolactam.

Another polyamide that can be used advantageously is a semiaromatic polyamide in which from 5 to 100 mol % of the dicarboxylic acid content derive from aromatic dicarboxylic acid having from 8 to 22 carbon atoms, and which has a crystallite melting point $T_m$ of at least 260° C., preferably of at least 270° C. and particularly preferably of at least 280° C., determined according to ISO 11357 in the 2nd heating procedure. Polyamides of this type are usually termed PPA. They can be produced from a combination of diamine and dicarboxylic acid, optionally with addition of an w-aminocarboxylic acid or the corresponding lactam. Examples of suitable types are PA66/6T, PA6/6T, PA6T/MPMDT (where MPMD means 2-methylpentamethylenediamine), PA9T, PA10T, PA11T, PA12T, PA14T, and also copolycondensates of these last-mentioned types with an aliphatic diamine and with an aliphatic dicarboxylic acid or with an ω-aminocarboxylic acid or, respectively, a lactam.

The moulding composition can comprise further components alongside polyamide, examples being impact modifiers, other thermoplastics, plasticizers and other conventional additives. The only requirement is that the polyamide forms the matrix of the moulding composition.

The fluoropolymer used for the tape can by way of example be a polyvinylidene fluoride (PVDF), an ethylene-tetrafluoroethylene copolymer (ETFE), an ETFE modified with the aid of a tercomponent, such as propene, hexafluoropropene, vinyl fluoride or vinylidene fluoride (for example EFEP), an ethylene-chlorotrifluoroethylene copolymer (ECTFE), a polychlorotrifluoro-ethylene (PCTFE), a chlorotrifluoroethylene-perfluorinated alkyl vinyl ether-tetrafluoroethylene copolymer (CPT), a tetrafluoroethylene-hexafluoropropene copolymer (FEP) or a tetrafluoroethylene-perfluorinated alkyl vinyl ether copolymer (PFA). It is also possible to use copolymers based on vinylidene fluoride which comprise up to 40% by weight of other monomers, for example trifluoroethylene, chlorotrifluoroethylene, ethylene, propene and hexafluoro-propene.

Polyphenylene sulphone (PPSU) is produced by way of example with trade mark Radel® by Solvay Advanced Polymers. It can be produced from 4,4'-dihydroxybiphenyl and 4,4'-dihydroxydiphenyl sulphone via nucleophilic substitution. Another material particularly suitable for use as anti-wear tape is a PPSU/fluoropolymer blend, for example a PPSU/PTFE blend.

The polyarylene ether ketone which can likewise be used comprises units of the formulae

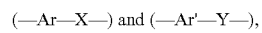

where Ar and Ar' are a divalent aromatic moiety, preferably 1,4-phenylene, 4,4'-biphenylene, or else 1,4-, 1,5- or 2,6-naphthylene. X is an electron-withdrawing group, preferably carbonyl or sulphonyl, while Y is another group, such as O, S, $CH_2$, isopropylidene or the like. At least 50%, preferably at least 70% and particularly preferably at least 80%, of the groups X here are a carbonyl group, while at least 50%, preferably at least 70% and particularly preferably at least 80% of the groups Y are composed of oxygen.

In the preferred embodiment, 100% of the groups X are composed of carbonyl groups and 100% of the groups Y are composed of oxygen. In the said embodiment, the polyarylene ether ketone can by way of example be a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl groups and oxygen groups are naturally also possible.

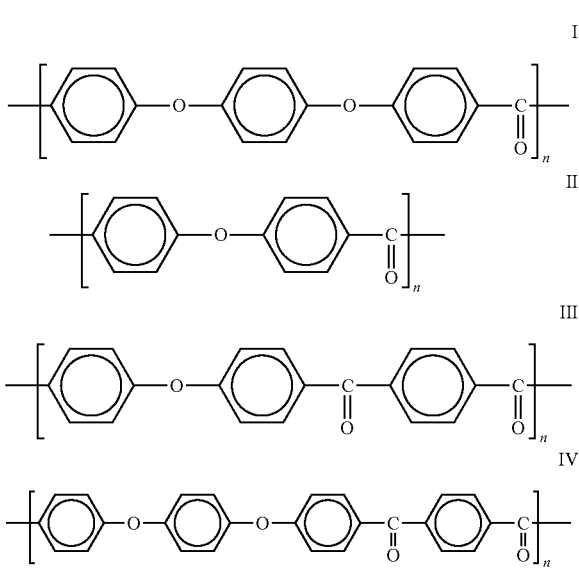

The polyarylene ether ketone is semicrystalline, and this is discernible by way of example in DSC analysis through appearance of a crystallite melting point $T_m$, which in most instances is of the order of magnitude of 300° C. or thereabove.

The polyphenylene sulphide used for the tape comprises units of the formula

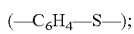

and is preferably composed of at least 50% by weight, at least 70% by weight or at least 90% by weight of the said units. The remaining units can be those stated above for the case of the polyarylene ether ketone, or tri- or tetrafunctional branching-point units, where these result from concomitant use of, for example, trichlorobenzene or tetrachlorobenzene during synthesis. A wide variety of grades of, or moulding compositions comprising, polyphenylene sulphide are commercially available.

In the case of the polyarylene ether ketone/polyphenylene sulphide blends, the two components can be present in any conceivable mixing ratio, and the entire range of composition is therefore covered, from pure polyarylene ether ketone extending to pure polyphenylene sulphide. The blend generally comprises at least 0.01% by weight of polyarylene ether ketone and, respectively, at least 0.01% by weight of polyphenylene sulphide. In one preferred embodiment the blend comprises at least 50% by weight of polyarylene ether ketone.

Ethylene-vinyl alcohol copolymers (EVOH) have been known for a long time. EVOH is a copolymer of ethylene and vinyl alcohol and is sometimes also called EVAL. The ethylene content in the copolymer is generally from 25 to 60 mol % and in particular from 28 to 45 mol %. A wide variety of types is obtainable commercially, for example from Kuraray with trademark EVAL™.

The polyalkylene naphthalate derives from an aliphatic or cycloaliphatic diol having from 2 to 8 carbon atoms and from a naphthalenedicarboxylic acid. Examples of suitable diols are ethanediol, 1,3-propanediol, 1,4-butanediol, 1,5-pentanediol, 1,6-hexanediol, 1,8-octanediol, neopentyl glycol, and 1,4-cyclohexanedimethanol. Examples of suitable naphthalenedicarboxylic acids are 1,4-, 1,5-, 2,6- and 2,7-naphthalenedicarboxylic acid. Preferred polyalkylene naphthalates are in particular polyethylene 2,6-naphthalate, polypropylene 2,6-naphthalate, polybutylene 2,6-naphthalate, and polyhexylene 2,6-naphthalate.

The moulding composition of the tape or the moulding composition of the individual layers can comprise the conventional auxiliaries and additives and also optionally further polymers, examples being, in the case of the polyarylene ether ketone, fluoropolymers, such as PFA (a copolymer of tetrafluoroethylene and perfluorinated vinyl methyl ether), polyimide, polyetherimide, LCP, for example liquid-crystalline polyester, polysulphone, polyether sulphone, polyphenyl sulphone, polybenzimidazole (PBI) or other high-temperature-resistant polymers, examples in the case of the polyphenylene sulphide being copolymers and, respectively, terpolymers of ethylene with polar comonomers, and an example in the case of the semiaromatic polyamide being an aliphatic polyamide. The polyamide moulding composition can by way of example also comprise a hydrolysis stabilizer, or a plasticizer or, respectively, impact modifiers. In the case of use as anti-wear tape, the moulding composition of the tape can moreover comprise a lubricant, such as graphite, molybdenum disulphide, hexagonal boron nitride or PTFE. The proportion of olefinic polymer, polyamide, fluoropolymer, polyalkylene naphthalate, EVOH, polyphenyl sulphone, polyarylene ether ketone, polyphenylene sulphide, and, respectively, polyarylene ether ketone/polyphenylene sulphide blend in the moulding composition is at least 50% by weight, preferably at least 60% by weight, particularly preferably at least 70% by weight, with particular preference at least 80% by weight and very particularly preferably at least 90% by weight. The tape can moreover also have long-fibre reinforcement, for example by glass-fibre textile or by glass-fibre rovings. In this case it can also comprise a further layer made of the unreinforced moulding composition, and/or can serve to reduce the extent of, or to replace, metal reinforcement. The width of the tape depends on the diameter of the pipe. Usual widths are in the range from about 20 mm to about 700 mm and preferably in the range from about 30 mm to about 500 mm. The thickness of the tape is subject to restriction insofar as it firstly must have adequate mechanical stability and secondly must have adequate flexibility to retain good winding capability. The thickness of the tape in practice is therefore usually from 0.05 mm to 3 mm and preferably in the range from 0.1 mm to 2 mm.

The cross section of the tape can be rectangular. However, it can also have lateral recesses, so that the overlapping regions extend into one another and give a winding surface which is in essence smooth.

A sublayer of tape is usually wound so as to overlap; a sufficient order of magnitude for the overlap region is about 10% of the width of the tape. However, it is also possible to wind a first sublayer of tape with flush edges and to wind a second sublayer of tape thereover likewise with flush edges, but with displacement by about one half of the width of the tape.

After the winding process, the overlap locations of the tape are welded to one another. This can be achieved either by hot-gas welding, by contact with a heated tool, with the aid of a flame, or advantageously by introducing electro-magnetic radiation in the UV, visible or IR spectral region. Particular preference is given to laser welding or infrared welding. When the material is used as creep-prevention tape or as anti-wear tape, spot welding is in principle sufficient to fix the tapes; however, preference is given to continuous production of an uninterrupted weld. It is also possible, of course, to weld the entire surfaces of the overlap regions of the tapes to one another.

In the case of laser welding and infrared welding of two components, the upper component through which radiation passes is in essence transparent to the radiation used, whereas the lower component has been rendered absorbent. In order to achieve an ideal result from the welding process, it is therefore advantageous that the absorption properties of the tape differ across the entire width. This can be achieved via coextrusion of a moulding composition that is in essence transparent with a corresponding moulding composition that has however been rendered absorbent, so that one side of the tape has an absorbent strip of width, for example, from about 3 to about 90% of the entire width of the tape. When the tape is wound, care then has to be taken that the absorbent side is placed downwards and is covered by the transparent side. As an alternative to this, if two sublayers of tape are wound over one another, for example respectively with flush contact, the material of the lower tape sublayer may comprise an absorbent addition, whereas the material of the upper tape sublayer is substantially transparent. However, it is also possible, when very thin tapes are used, that the entire tape material has been rendered absorbent.

Laser welding, infrared welding, and also suitable absorbent additions, are well known to the person skilled in the art. The absorbent addition most often used is carbon black, but it is also possible to use the usual amounts of any other known addition.

By virtue of the mixing of the shape according to the invention for installation and operation, and also the gas-tight properties achieved it is possible to achieve greater design freedom for the unbonded flexible pipe.

The invention claimed is:

1. A process for producing a flexible pipe of multilayer structure with unbonded layers effective for conveying a liquid or gas selected from the group consisting of crude oil, natural gas, methanol, and $CO_2$ at a temperature of at least 130° C., the process comprising:
   forming a layer by winding a tape helically onto a more internal layer, and
   simultaneously or subsequently welding an upper sublayer of the tape and a lower sublayer of the tape to one another at an overlap region of no more than about 10% of the width of the tape via introduction of electromagnetic radiation,
   wherein the tape comprises a plastics molding composition based on olefinic polymer, polyamide, fluoropolymer, polyphenyl sulphone, polyarylene ether ketone, polyphenylene sulphide, or a polyarylene ether ketone/polyphenylene sulphide blend, the portions of the upper sublayer of the tape and the lower sublayer of the tape not welded to one another at the overlap region being no more than frictionally bonded together,
   wherein the electromagnetic radiation absorption properties of the tape differ across the width of the tape,
   when helically winding the tape, a more electromagnetic radiation absorbent width of the tape is covered by a more electromagnetic radiation transparent width of the tape, and
   at least two of the layers of the multilayer structure are not bonded directly or indirectly together.

2. The process of claim 1,
   wherein the more internal layer comprises a carcass, a tubular interior lining, or a reinforcing layer.

3. The process of claim 1,
   wherein the tape comprises a molding composition based on polyamide, fluoropolymer, polyphenyl sulphone, polyarylene ether ketone, polyphenylene sulphide, or a polyarylene ether ketone/polyphenylene sulphide blend.

4. The process of claim 1, wherein the tape is a single-layer tape or a multilayer tape.

5. The process of claim 4,
   wherein the tape is a multilayer tape comprising a barrier layer with respect to diffusion of $H_2S$ or $CO_2$.

6. The process of claim 5,
   wherein the barrier layer comprises an EVOH molding composition.

7. The process of claim 1, wherein the tape comprises long-fiber reinforcement.

8. The process of claim 1,
   wherein the welding comprises laser welding or infrared welding the upper sublayer of the tape and a lower sublayer of the tape to one another at the overlap region as radiation passes through the more transparent upper sublayer of the tape.

9. The process of claim 2,
   wherein the more internal layer comprises a reinforcing layer, and
   the reinforcing layer comprises a helically arranged steel wire, a steel profile, or a steel strip.

10. The process of claim 1,
    wherein a first side of the tape comprises a first molding composition,
    a second side of the tape comprises a second molding composition, and
    the first and second molding compositions are of identical or similar composition.

11. The process of claim 3,
    wherein the tape comprises a polyamide, and
    monomer units of the polyamide comprise an average of at least 8 carbon atoms.

12. The process of claim 3,
    wherein the tape comprises a polyarylene ether ketone,
    the polyarylene ether ketone comprises units of formulae $$(-Ar-X-)$$

and $$(-Ar'-Y-),$$

each of Ar and Ar' is a divalent aromatic moiety,
X is an electron-withdrawing group, and
Y is another group.

13. The process of claim 12, wherein Ar, Ar', or both, comprise 1,4-phenylene, 4,4'-biphenylene, 1,4-naphthylene, 1,5-naphthylene, 2,6-naphthylene, or any combination thereof.

14. The process of claim 12, wherein X comprises carbonyl or sulphonyl.

15. The process of claim 12, wherein Y comprises O, S, $CH_2$, or isopropylidene.

16. The process of claim 1,
    wherein the multilayer structure comprises a reinforcing layer and a plastics layer with no direct or indirect bonding between them.

17. A process for producing a flexible pipe of multilayer structure with unbonded layers effective for conveying a liquid or gas selected from the group consisting of crude oil, natural gas, methanol, and $CO_2$ at a temperature of at least 130° C., the process comprising:
    simultaneously winding two layers of tape helically onto a more internal layer, the upper layer of tape being wound over the lower layer of tape, and
    simultaneously or subsequently welding the upper layer of tape and the lower layer of the tape to one another at an overlap region of no more than about 10% of the width of each tape via introduction of electromagnetic radiation, wherein each layer of tape comprises a plastics molding composition based on olefinic polymer, polyamide, fluoropolymer, polyphenyl sulphone, polyarylene ether ketone, polyphenylene sulphide, or a polyarylene ether ketone/polyphenylene sulphide blend, the portions of the upper layer of tape and the lower layer of tape not welded to one another at the overlap region being no more than frictionally bonded together, wherein the electromagnetic radiation absorption properties of the lower layer of tape are greater than the electromagnetic radiation absorption properties of the upper layer of tape and the electromagnetic radiation transparent properties of the lower layer of tape is less than the electromagnetic radiation transparent properties of the upper layer of tape, and at least two of the layers of the multilayer structure are not bonded directly or indirectly together.

18. The process of claim 17, wherein each layer of tape comprises a molding composition based on polyamide, fluoropolymer, polyphenyl sulphone, polyarylene ether ketone, polyphenylene sulphide, or a polyarylene ether ketone/polyphenylene sulphide blend.

19. The process of claim 17, wherein the welding comprises laser welding or infrared welding the upper layer of tape and the lower layer of tape to one another at the overlap region as radiation passes through the more transparent upper layer of tape.

20. The process of claim 17, wherein each layer of tape comprises a polyamide, and monomer units of the polyamide comprise an average of at least 8 carbon atoms.

* * * * *